United States Patent
Lin

(10) Patent No.: US 7,363,934 B1
(45) Date of Patent: Apr. 29, 2008

(54) CONTROL VALVE HAVING PRESSURE BALANCE EFFECT

(75) Inventor: Mei-Fen Lin, Changhua (TW)

(73) Assignee: ING TZON Co., Ltd., Changhua Hsien (TW)

( * ) Notice: Subject to any disclaimer, the term of this patent is extended or adjusted under 35 U.S.C. 154(b) by 275 days.

(21) Appl. No.: 11/333,673

(22) Filed: Jan. 17, 2006

(51) Int. Cl.
*F16K 11/06* (2006.01)
*G05D 11/16* (2006.01)

(52) U.S. Cl. ............... 137/98; 137/315.13; 137/454.6; 137/625.41

(58) Field of Classification Search ............ 137/98, 137/100, 454.6, 625.41, 625.47, 315.13

See application file for complete search history.

(56) References Cited

U.S. PATENT DOCUMENTS

| | | | |
|---|---|---|---|
| 5,725,010 A * | 3/1998 | Marty et al. | 137/100 |
| 6,427,713 B1 * | 8/2002 | Dempsey et al. | 137/98 |
| 7,143,777 B2 * | 12/2006 | Lin | 137/98 |
| 2005/0022886 A1 * | 2/2005 | Lin | 137/625.41 |

* cited by examiner

*Primary Examiner*—Stephen M. Hepperle
(74) *Attorney, Agent, or Firm*—Alan Kamrath; Kamrath & Associates PA

(57) ABSTRACT

A control valve for a mixed water faucet includes a housing, two sealing gaskets, a control shaft, a ceramic unit, a sealing ring, a sleeve, a pressure balance unit, an adjusting cock, and a fastening member. The pressure balance unit includes a bushing and a spindle. The ceramic unit includes a fixed plate, a movable plate, and a protective jacket. Thus, the movable plate is rotatable relative to the fixed plate to change the connection area between the water outlet chamber of the movable plate and the water inlet chambers of the fixed plate so as to regulate the water flow rate and the mixed proportion of the cold water and the hot water.

20 Claims, 5 Drawing Sheets

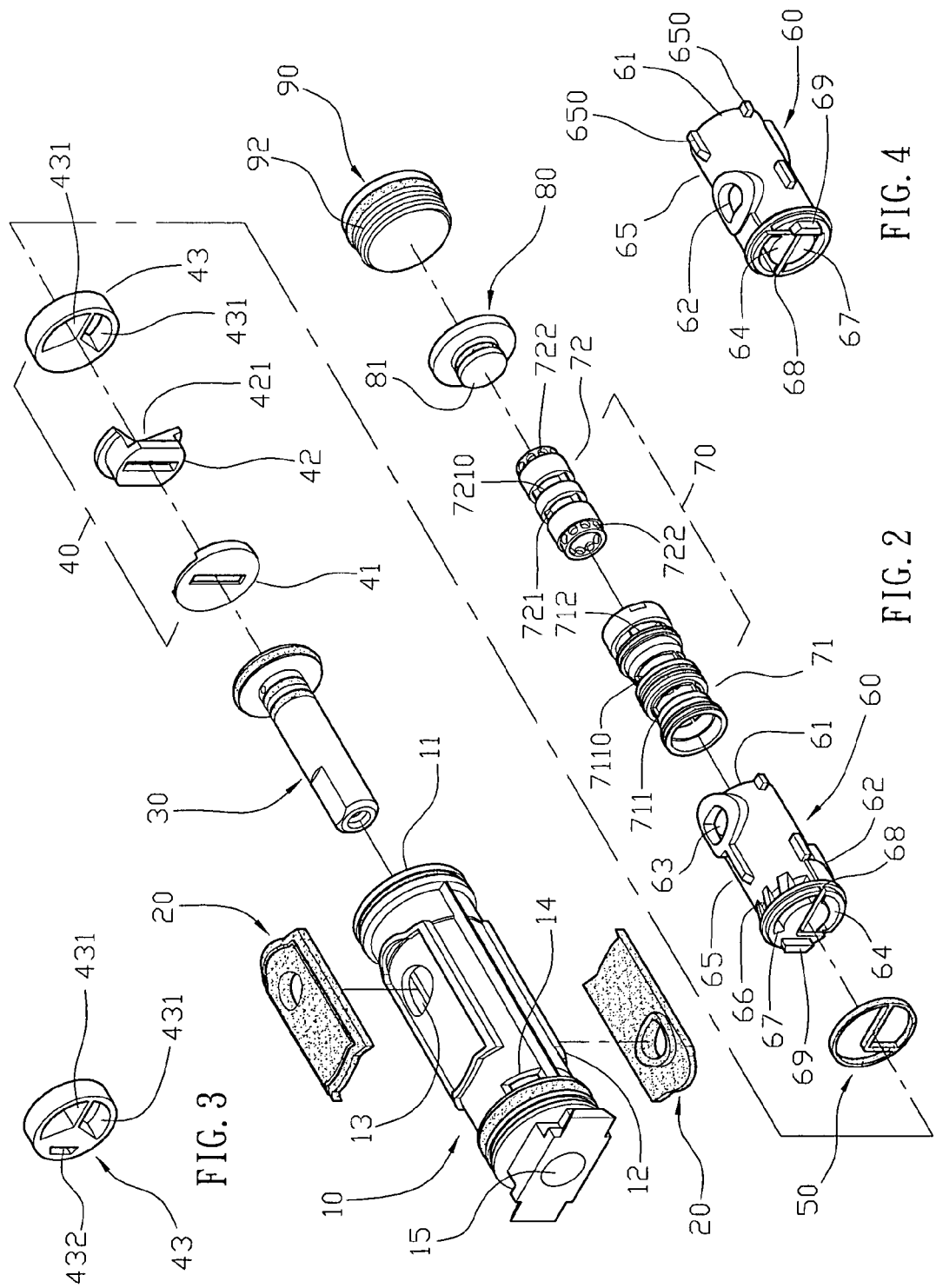

CONTROL VALVE HAVING PRESSURE BALANCE EFFECT

BACKGROUND OF THE INVENTION

1. Field of the Invention

The present invention relates to a control valve for a mixed water faucet, and more particularly to a control valve having a pressure balance effect.

2. Description of the Related Art

A conventional control valve for a mixed water faucet is provided with a pressure balance valve that can stop input of the hot water in the hot water pipe when the water pressure in the cold water pipe drops largely and can provide a pressure balance between the hot water and the cold water in a short period of time, thereby preventing a user from being hurt by the hot water during the shower process. However, the water temperature of the control valve cannot be controlled exactly. In addition, the water output of the control valve is smaller and cannot be controlled exactly. Further, the sealing rings contained in the control valve cannot withstand the water pressure largely so that the sealing rings are easily worn out to produce a water leak. Further, the water pressure balance is acted instantaneously, so that the water pressure is easily regulated excessively.

SUMMARY OF THE INVENTION

The primary objective of the present invention is to provide a control valve for a mixed water faucet, wherein the control valve has a pressure balance effect.

Another objective of the present invention is to provide a control valve, wherein the positioning block of the sleeve is secured in the positioning hole of the fixed plate so that the fixed plate is secured to the sleeve, thereby preventing the fixed plate from detaching from the sleeve.

A further objective of the present invention is to provide a control valve, wherein the fixed plate is secured to the sleeve, so that the sealing ring is sandwiched between the sleeve and the fixed plate, thereby preventing the sealing ring from detaching from the sleeve.

A further objective of the present invention is to provide a control valve, wherein the tubular spindle is movably mounted in the bushing to regulate the water flow rate of the first water inlet groove and the second water inlet groove of the bushing by the first adjusting slot and the second adjusting slot of the spindle so as to balance the water pressure of the first water inlet groove and the second water inlet groove of the bushing.

A further objective of the present invention is to provide a control valve, wherein the spindle of the pressure balance unit has two ends each formed with a plurality of pressure relief vents to reduce the instantaneous water pressure applied on the spindle to prevent the spindle from being deflected sideward by the water pressure.

A further objective of the present invention is to provide a control valve, wherein each of the two water inlet chambers of the fixed plate has one third of an area of the fixed plate, and the water outlet chamber of the movable plate has one third of an area of the movable plate, so that the water output of the ceramic unit is controlled evenly and optimally.

A further objective of the present invention is to provide a control valve, wherein the stop flange of the adjusting cock is adjustably inserted into the second end of the bushing so that the adjusting cock is not locked in the receiving chamber of the housing so as to allow a tolerance of other parts of the control valve, thereby facilitating assembly of the control valve.

Further benefits and advantages of the present invention will become apparent after a careful reading of the detailed description with appropriate reference to the accompanying drawings.

BRIEF DESCRIPTION OF THE DRAWINGS

FIG. 2 is an exploded perspective view of the control valve as shown in FIG. 1.

FIG. 3 is a perspective view of a fixed plate of the control valve as shown in FIG. 2.

FIG. 4 is a perspective view of a sleeve of the control valve as shown in FIG. 2.

DETAILED DESCRIPTION OF THE INVENTION

Figure 1:
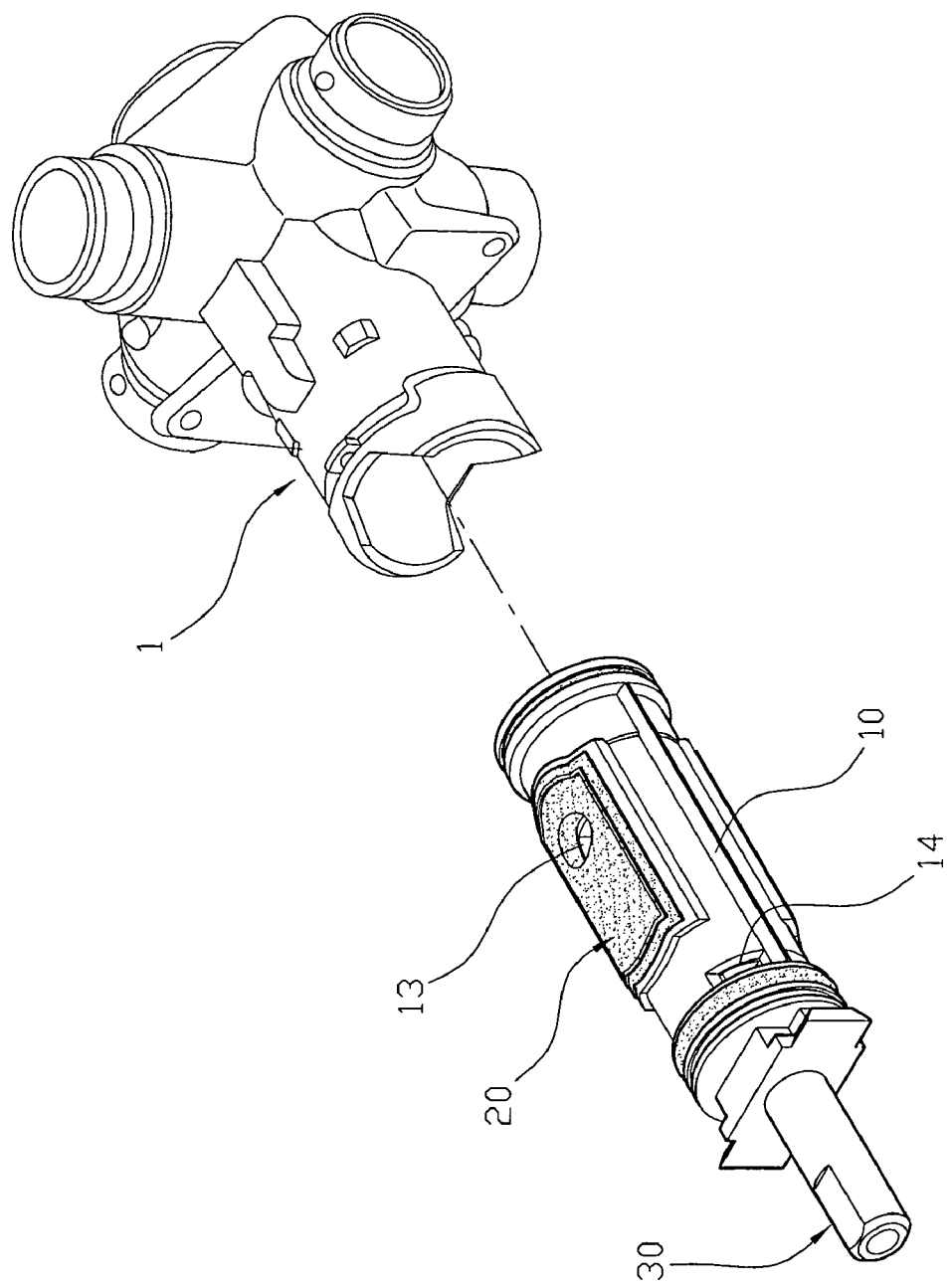
FIG. 1 is a perspective view of a control valve for a faucet in accordance with the preferred embodiment of the present invention.
Figure 5:
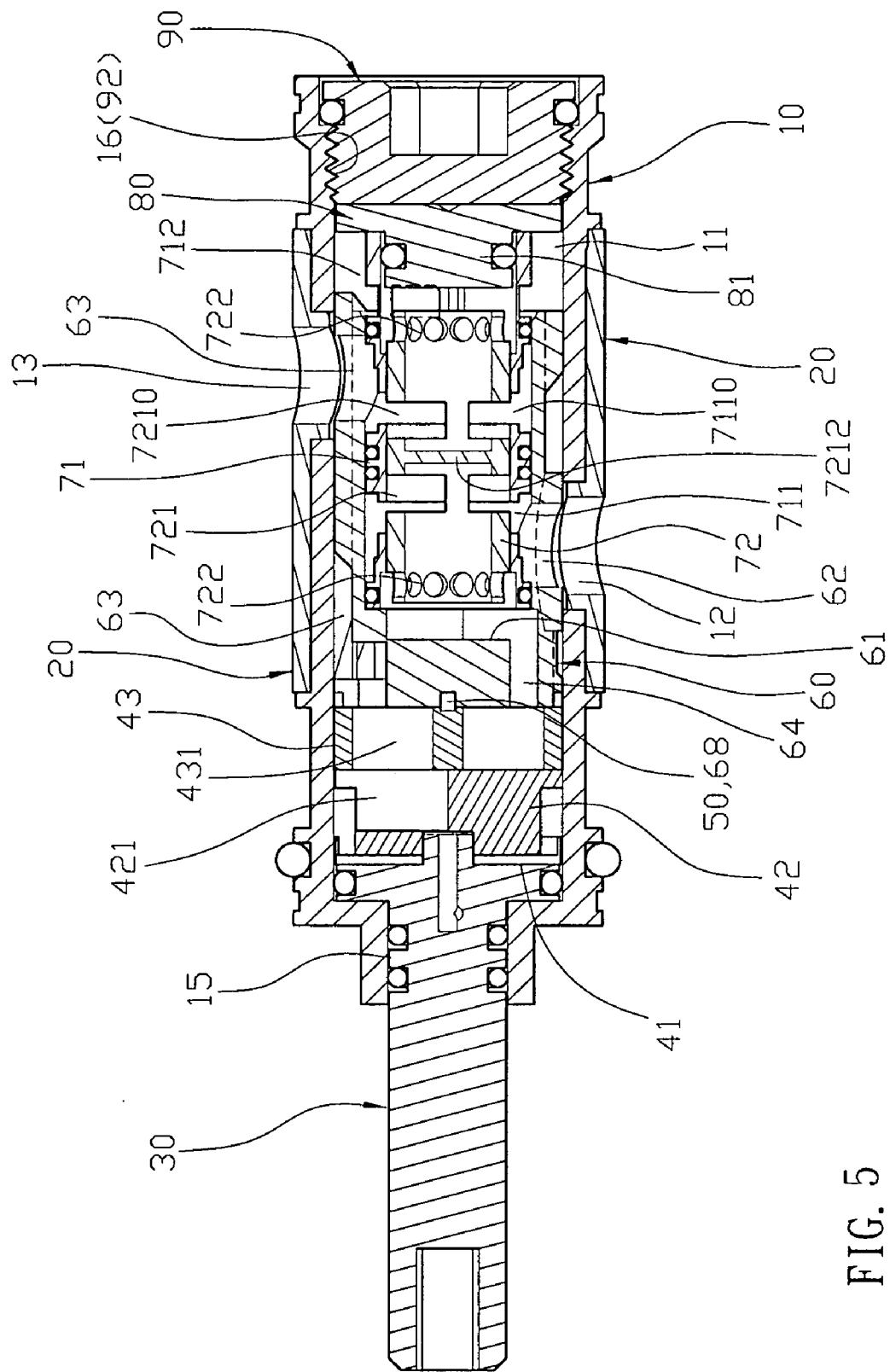
FIG. 5 is a plan cross-sectional view of the control valve as shown in FIG. 1.

Referring to the drawings and initially to FIGS. 1-6, a control valve for a mixed water faucet in accordance with the preferred embodiment of the present invention comprises a housing 10, two sealing gaskets 20, a control shaft 30, a ceramic unit 40, a sealing ring 50, a sleeve 60, a pressure balance unit 70, an adjusting cock 80, and a fastening member 90.

The housing 10 has an inside formed with a receiving chamber 11 and has a peripheral wall formed with a cold water inlet 12, a hot water inlet 13 and a water outlet 14 each connected to the receiving chamber 11. The receiving chamber 11 of the housing 10 has a first end formed with a stepped shaft hole 15 and a second end formed with an inner thread 16 (see FIG. 5). The water outlet 14 of the housing 10 is located adjacent to the first end of the housing 10. The cold water inlet 12 is located adjacent to the first end of the housing 10, and the hot water inlet 13 of the housing 10 is located adjacent to the second end of the housing 10.

The two sealing gaskets 20 are mounted on the peripheral wall of the housing 10 and are enclosed around the cold water inlet 12 and the hot water inlet 13 of the housing 10 respectively.

The sleeve 60 is mounted in the receiving chamber 11 of the housing 10 and has an inside formed with a mounting chamber 61 and a peripheral wall formed with a water channel 65 that is defined by a plurality of protruding ribs 650 (see FIG. 4) on the peripheral wall of the sleeve 60. The sleeve 60 has an end face formed with a positioning block 69, a substantially arc-shaped cold water slot 64 and a substantially arc-shaped hot water slot 67. The cold water slot 64 of the sleeve 60 is connected to the mounting chamber 61. The end face of the sleeve 60 is formed with a retaining groove 68 surrounding a periphery of the cold water slot 64 and the hot water slot 67, and the sealing ring 50 is mounted in the retaining groove 68 of the sleeve 60. The peripheral wall of the sleeve 60 is formed with a plurality of water passages 66 connected to the hot water slot 67 and the water channel 65. The peripheral wall of the sleeve 60 is formed with a cold water inlet 62 connected to the cold water inlet 12 of the housing 10 and a hot water inlet 63 connected to the hot water inlet 13 of the housing 10.

The ceramic unit 40 made of ceramic material is mounted in the housing 10 and rested on the sleeve 60. The ceramic unit 40 includes a fixed plate 43 secured to the sleeve 60 and formed with two water inlet chambers 431 aligning with the cold water slot 64 and the hot water slot 67 of the sleeve 60 respectively, a movable plate 42 rotatably mounted in the receiving chamber 11 of the housing 10 and formed with a water outlet chamber 421 connected to the two water inlet chambers 431 of the fixed plate 43 and the water outlet 14 of the housing 10, and a protective jacket 41 mounted on the movable plate 42. Each of the two water inlet chambers 431 of the fixed plate 43 has a sector shape and has one third of an area of the fixed plate 43. The fixed plate 43 has a side formed with a positioning hole 432 (see FIG. 3), and the positioning block 69 of the sleeve 60 is secured in the positioning hole 432 of the fixed plate 43. The fixed plate 43 is rested on the sealing ring 50 so that the sealing ring 50 is sandwiched between the sleeve 60 and the fixed plate 43. The water outlet chamber 421 of the movable plate 42 has a sector shape and has one third of an area of the movable plate 42.

The control shaft 30 is rotatably mounted in the shaft hole 15 of the housing 10 and has a first end protruding outward from the shaft hole 15 of the housing 10 and a second end secured to the protective jacket 41 and the movable plate 42 of the ceramic unit 40 to drive the movable plate 42 to rotate relative to the fixed plate 43.

The pressure balance unit 70 is mounted in the sleeve 60 and includes a tubular bushing 71 mounted in the mounting chamber 61 of the sleeve 60, and a tubular spindle 72 movably mounted in the bushing 71.

The bushing 71 of the pressure balance unit 70 has a first end formed with a first water inlet groove 711 connected to the cold water slot 64 of the sleeve 60 and a second end formed with a second water inlet groove 7110 and a pressure regulating water outlet 712 connected to the second water inlet groove 7110 and the water channel 65 of the sleeve 60. The pressure regulating water outlet 712 of the bushing 71 is protruded outward from the mounting chamber 61 of the sleeve 60.

The spindle 72 of the pressure balance unit 70 has a mediate portion formed with a first adjusting slot 721 connected to the first water inlet groove 711 of the bushing 71 and a second adjusting slot 7210 connected to the second water inlet groove 7110 and the pressure regulating water outlet 712 of the bushing 71. The spindle 72 of the pressure balance unit 70 has an inside formed with a baffle 7212 (see FIG. 5) to separate the first adjusting slot 721 and the second adjusting slot 7210. The spindle 72 of the pressure balance unit 70 has two ends each formed with a plurality of pressure relief vents 722 arranged in an annular manner.

The adjusting cock 80 is mounted in the receiving chamber 11 of the housing 10 and has a side formed with a stop flange 81 inserted into the second end of the bushing 71.

The fastening member 90 is secured in the receiving chamber 11 of the housing 10 and rested on the adjusting cock 80. The fastening member 90 has an outer thread 92 screwed into the inner thread 16 of the housing 10.

Figure 6:
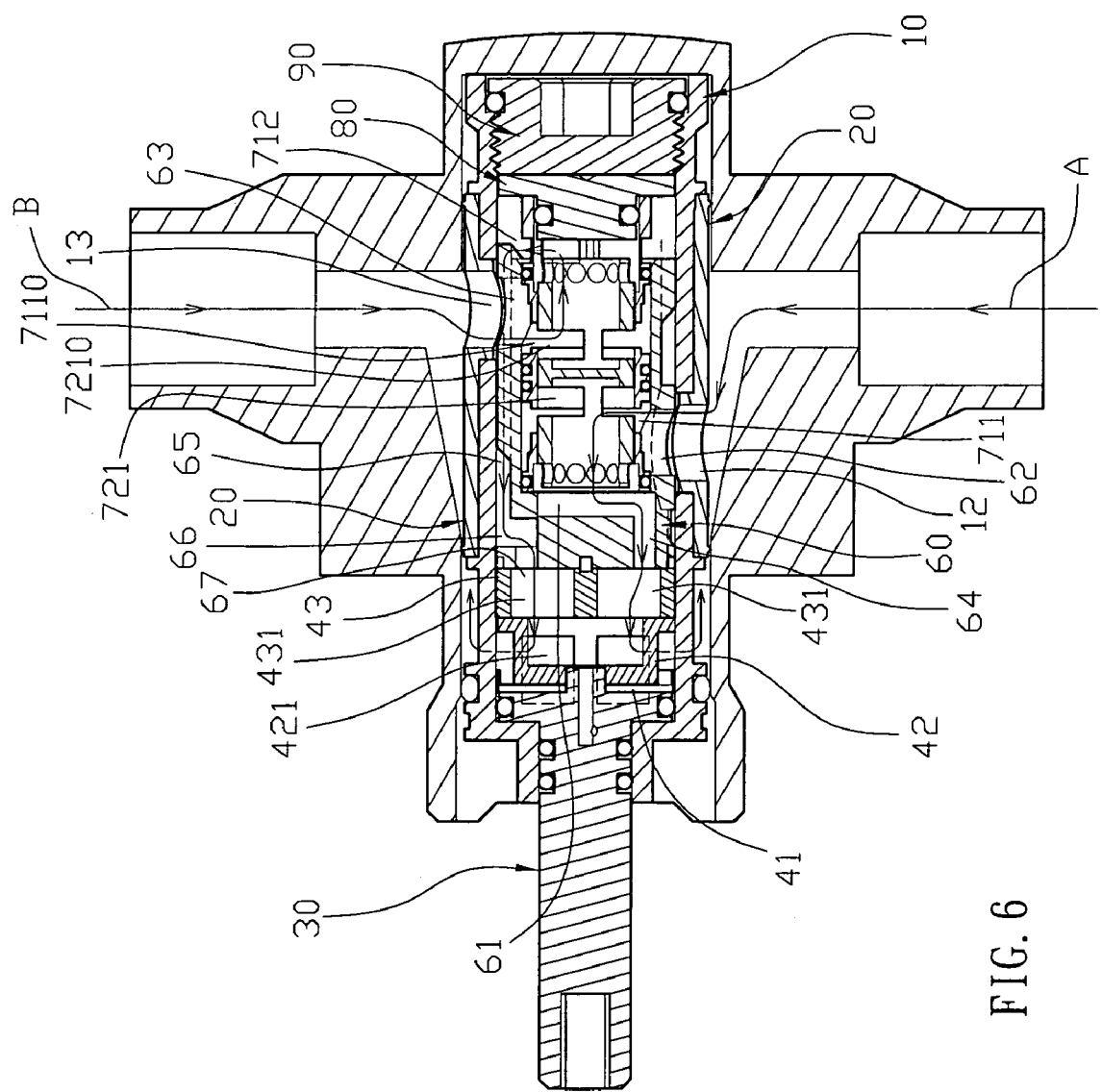
FIG. 6 is a schematic operational view of the control valve as shown in FIG. 5 in use.

In operation, referring to FIGS. 1-10, the control valve is mounted in a faucet body 1 of a mixed water faucet. In practice, the cold water from the faucet body 1 in turn flows through the cold water inlet 12 of the housing 10, the cold water inlet 62 of the sleeve 60, the first water inlet groove 711 of the bushing 71, the first adjusting slot 721 of the spindle 72 and the cold water slot 64 of the sleeve 60 into the respective water inlet chamber 431 of the fixed plate 43, and the flow direction of the cold water is indicated by the arrow "A" as shown in FIG. 6. On the other hand, the hot water from the faucet body 1 in turn flows through the hot water inlet 13 of the housing 10, the hot water inlet 63 of the sleeve 60, the second water inlet groove 7110 of the bushing 71, the second adjusting slot 7210 of the spindle 72, the pressure regulating water outlet 712 of the bushing 71, the water channel 65 of the sleeve 60, the water passages 66 of the sleeve 60 and the hot water slot 67 of the sleeve 60 into the respective water inlet chamber 431 of the fixed plate 43, and the flow direction of the hot water is indicated by the arrow "B" as shown in FIG. 6. Thus, when the cold and hot water from the water inlet chambers 431 of the fixed plate 43 flows into the water outlet chamber 421 of the movable plate 42, the cold water and the hot water are mixed. In such a manner, the movable plate 42 is driven by the control shaft 30 which is rotated by a faucet handle (not shown) and rotatable relative to the fixed plate 43 to change connection between the water outlet chamber 421 of the movable plate 42 and the water inlet chambers 431 of the fixed plate 43.

Figure 7:
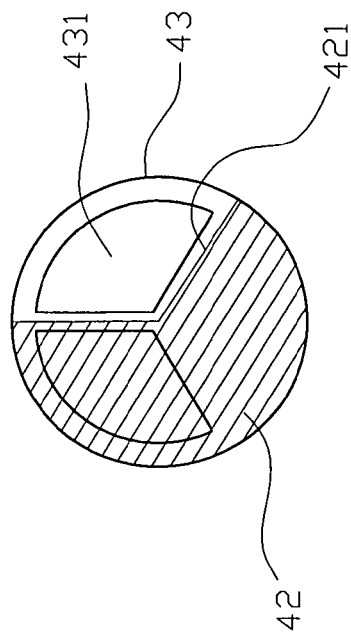
FIGS. 7-10 are schematic operational views of a ceramic unit of the control valve as shown in FIG. 2 in use.

As shown in FIG. 7, when the water outlet chamber 421 of the movable plate 42 is isolated from the water inlet chambers 431 of the fixed plate 43, the water inlet chambers 431 of the fixed plate 43 are closed by a wall of the movable plate 42 so as to stop the water flow.

Figure 8:
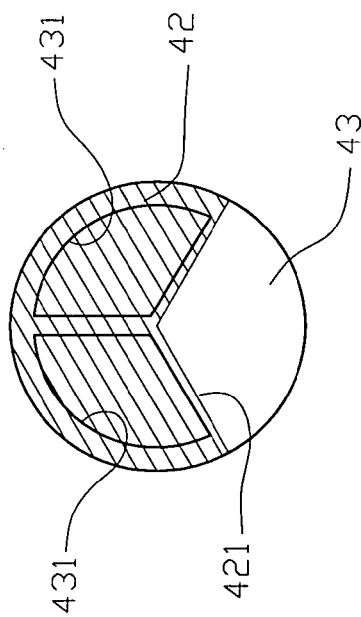

As shown in FIG. 8, when the water outlet chamber 421 of the movable plate 42 is both connected to the water inlet chambers 431 of the fixed plate 43, the cold water and the hot water are mixed in the water outlet chamber 421 of the movable plate 42 to form a mixed water which flows outward from the water outlet 14 of the housing 10 for use with a user.

Figure 9:
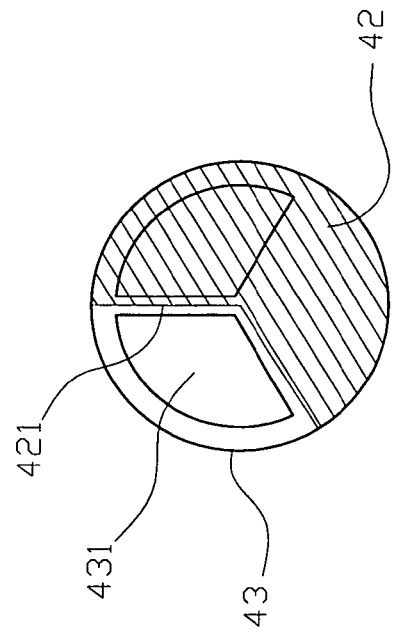
Figure 10:
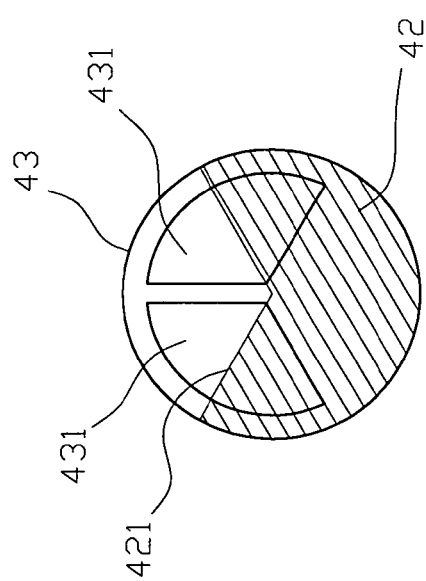

As shown in FIGS. 9 and 10, when the water outlet chamber 421 of the movable plate 42 is only connected to one of the water inlet chambers 431 of the fixed plate 43, only the cold water or the hot water flows into the water outlet chamber 421 of the movable plate 42 and flows outward from the water outlet 14 of the housing 10 for use with a user.

Thus, the movable plate 42 is rotatable relative to the fixed plate 43 to change the connection area between the water outlet chamber 421 of the movable plate 42 and the water inlet chambers 431 of the fixed plate 43 so as to regulate the water flow rate and the mixed proportion of the cold water and the hot water.

Accordingly, the positioning block 69 of the sleeve 60 is secured in the positioning hole 432 of the fixed plate 43 so that the fixed plate 43 is secured to the sleeve 60, thereby preventing the fixed plate 43 from detaching from the sleeve 60. In addition, the fixed plate 43 is secured to the sleeve 60, so that the sealing ring 50 is sandwiched between the sleeve 60 and the fixed plate 43, thereby preventing the sealing ring 50 from detaching from the sleeve 60. Further, the tubular spindle 72 is movably mounted in the bushing 71 to regulate the water flow rate of the first water inlet groove 711 and the second water inlet groove 7110 of the bushing 71 by the first adjusting slot 721 and the second adjusting slot 7210 of the spindle 72 so as to balance the water pressure of the first water inlet groove 711 and the second water inlet groove 7110 of the bushing 71. Further, the spindle 72 of the pressure balance unit 70 has two ends each formed with a plurality of pressure relief vents 722 to reduce the instantaneous water pressure applied on the spindle 72 to prevent the spindle 72 from being deflected sideward by the water pressure. Further, each of the two water inlet chambers 431 of the fixed plate 43 has one third of an area of the fixed plate 43, and the water outlet chamber 421 of the movable plate 42 has one third of an area of the movable plate 42, so that the water output of the ceramic unit 40 is controlled evenly and optimally. Further, the stop flange 81 of the adjusting cock 80 is adjustably inserted into the second end of the bushing 71 so that the adjusting cock 80 is not locked in the receiving chamber 11 of the housing 10 so as to allow a tolerance of other parts of the control valve, thereby facilitating assembly of the control valve.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A control valve, comprising:
a housing having an inside formed with a receiving chamber and having a peripheral wall formed with a cold water inlet, a hot water inlet and a water outlet each connected to the receiving chamber;
a sleeve mounted in the receiving chamber of the housing and having an inside formed with a mounting chamber and a peripheral wall formed with a water channel, the sleeve having an end face formed with a cold water slot and a hot water slot, the cold water slot of the sleeve being connected to the mounting chamber, the peripheral wall of the sleeve being formed with a plurality of water passages connected to the hot water slot and the water channel, the peripheral wall of the sleeve being formed with a cold water inlet connected to the cold water inlet of the housing and a hot water inlet connected to the hot water inlet of the housing;
a ceramic unit mounted in the housing and including a fixed plate secured to the sleeve and formed with two water inlet chambers aligning with the cold water slot and the hot water slot of the sleeve respectively, and a movable plate rotatably mounted in the receiving chamber of the housing and formed with a water outlet chamber connected to the two water inlet chambers of the fixed plate and the water outlet of the housing;
a pressure balance unit mounted in the sleeve and including a tubular bushing mounted in the mounting chamber of the sleeve, and a tubular spindle movably mounted in the bushing;
the bushing of the pressure balance unit having a first end formed with a first water inlet groove connected to the cold water slot of the sleeve and a second end formed with a second water inlet groove and a pressure regulating water outlet connected to the second water inlet groove and the water channel of the sleeve;
the spindle of the pressure balance unit having a mediate portion formed with a first adjusting slot connected to the first water inlet groove of the bushing and a second adjusting slot connected to the second water inlet groove and the pressure regulating water outlet of the bushing.

2. The control valve in accordance with claim 1, wherein the fixed plate has a side formed with a positioning hole, and the end face of the sleeve is formed with a positioning block secured in the positioning hole of the fixed plate.

3. The control valve in accordance with claim 1, wherein the end face of the sleeve is formed with a retaining groove surrounding a periphery of the cold water slot and the hot water slot, and the control valve further comprises a sealing ring mounted in the retaining groove of the sleeve.

4. The control valve in accordance with claim 3, wherein the fixed plate is rested on the sealing ring so that the sealing ring is sandwiched between the sleeve and the fixed plate.

5. The control valve in accordance with claim 1, wherein each of the two water inlet chambers of the fixed plate has a sector shape and has one third of an area of the fixed plate, and the water outlet chamber of the movable plate has a sector shape and has one third of an area of the movable plate.

6. The control valve in accordance with claim 1, wherein the pressure regulating water outlet of the bushing is protruded outward from the mounting chamber of the sleeve.

7. The control valve in accordance with claim 1, wherein the spindle of the pressure balance unit has an inside formed with a baffle to separate the first adjusting slot and the second adjusting slot.

8. The control valve in accordance with claim 1, wherein the spindle of the pressure balance unit has two ends each formed with a plurality of pressure relief vents arranged in an annular manner.

9. The control valve in accordance with claim 1, wherein the receiving chamber of the housing has a first end formed with a stepped shaft hole, the ceramic unit further includes a protective jacket mounted on the movable plate, and the control valve further comprises a control shaft rotatably mounted in the shaft hole of the housing and having a first end protruding outward from the shaft hole of the housing and a second end secured to the protective jacket and the movable plate of the ceramic unit to drive the movable plate to rotate relative to the fixed plate.

10. The control valve in accordance with claim 9, further comprising an adjusting cock mounted in the receiving chamber of the housing and having a side formed with a stop flange inserted into the second end of the bushing.

11. The control valve in accordance with claim 10, further comprising a fastening member secured in the receiving chamber of the housing and rested on the adjusting cock.

12. The control valve in accordance with claim 11, wherein the receiving chamber of the housing has a second end formed with an inner thread, and the fastening member has an outer thread screwed into the inner thread of the housing.

13. The control valve in accordance with claim 10, wherein the stop flange of the adjusting cock is adjustably inserted into the first end of the bushing so that the adjusting cock is not locked in the receiving chamber of the housing so as to allow a tolerance the control valve, thereby facilitating assembly of the control valve.

14. The control valve in accordance with claim 1, further comprising two sealing gaskets mounted on the peripheral wall of the housing and enclosed around the cold water inlet and the hot water inlet of the housing respectively.

15. The control valve in accordance with claim 1, wherein the water channel of the sleeve is defined by a plurality of protruding ribs on the peripheral wall of the sleeve.

16. The control valve in accordance with claim 1, wherein the cold water slot of the sleeve is substantially arc-shaped, and the hot water slot of the sleeve is substantially arc-shaped.

17. The control valve in accordance with claim 1, wherein the ceramic unit is rested on the sleeve.

18. The control valve in accordance with claim 1, wherein the spindle is movable in the bushing to regulate a water flow rate of the first water inlet groove and the second water inlet groove of the bushing by the first adjusting slot and the second adjusting slot of the spindle so as to balance a water pressure of the first water inlet groove and the second water inlet groove of the bushing.

19. The control valve in accordance with claim 1, wherein a cold water in turn flows through the cold water inlet of the housing, the cold water inlet of the sleeve, the first water inlet groove of the bushing, the first adjusting slot of the spindle and the cold water slot of the sleeve into the respective water inlet chamber of the fixed plate.

20. The control valve in accordance with claim 1, wherein a hot water in turn flows through the hot water inlet of the housing, the hot water inlet of the sleeve, the second water inlet groove of the bushing, the second adjusting slot of the spindle, the pressure regulating water outlet of the bushing, the water channel of the sleeve, the water passages of the sleeve and the hot water slot of the sleeve into the respective water inlet chamber of the fixed plate.

\* \* \* \* \*